United States Patent
Han et al.

(10) Patent No.: US 7,740,818 B2
(45) Date of Patent: Jun. 22, 2010

(54) TRANSITION METAL-SUBSTITUTED HYDROTALCITE CATALYST FOR REMOVING NITROGEN OXIDES FROM THE EXHAUST GAS OF DIESEL ENGINE BY STORAGE-REDUCTION

(75) Inventors: Hyun-Sik Han, Ansan (KR); Young-San Yoo, Shiheung (KR); Gon Seo, Gwangju (KR); Gi-Won Park, Gwangju (KR)

(73) Assignee: Heesung Engelhard Corporation, Kyungki-Do (KR)

( * ) Notice: Subject to any disclaimer, the term of this patent is extended or adjusted under 35 U.S.C. 154(b) by 0 days.

(21) Appl. No.: 12/386,415

(22) Filed: Apr. 17, 2009

(65) Prior Publication Data

US 2009/0257934 A1  Oct. 15, 2009

Related U.S. Application Data

(63) Continuation of application No. 11/820,959, filed on Jun. 21, 2007, now abandoned.

(30) Foreign Application Priority Data

Jun. 23, 2006  (KR) .................. 10-2006-0056659

(51) Int. Cl.
*B01D 53/00*  (2006.01)
(52) U.S. Cl. ............... 423/213.5; 423/213.2; 423/235; 423/239.1; 502/526
(58) Field of Classification Search .............. 423/213.2, 423/213.5, 235, 239.1; 502/526
See application file for complete search history.

(56) References Cited

U.S. PATENT DOCUMENTS

| 5,928,496 | A | 7/1999 | Albers et al. ................. 208/113 |
| 6,338,831 | B1 * | 1/2002 | Strehlau et al. ........ 423/244.07 |
| 6,419,890 | B1 * | 7/2002 | Li ............................ 423/239.1 |
| 6,486,365 | B1 | 11/2002 | Fulmer et al. ............... 568/768 |

OTHER PUBLICATIONS

Vaccari, A., "Clays and catalysis: a promising future" in Elsevier Applied Clay Science 14 (1999) pp. 161-198.
Vaccari, Angelo, "Preparation and catalytic properties of cationic and anionic clays" in Elsevier Catalysis Today 41 (1998), pp. 53-71.
Kanezaki, E., "A thermally induced metastable solid phase of Mg/Al-layered double hydroxides by means of in situ high temperature powder x-ray diffraction" in Journal of Materials Science Letters 17 (1998) pp. 371-374.
Kawabata et al.,"Nickel-containing Mg-Al hydrotalcite-type anionic clay catalyst for the oxidation of alcohols with molecular oxygen," *Journal of Molecular Catalysis* A: Chemical 236 (2005) pp. 206-215. (Available online May 25, 2005).

* cited by examiner

*Primary Examiner*—Elizabeth D Wood
(74) *Attorney, Agent, or Firm*—Ohlandt, Greeley, Ruggiero & Perle, L.L.P.

(57) ABSTRACT

Disclosed herein is a transition metal-substituted hydrotalcite catalyst for removing nitrogen oxides using a storage-reduction method, in which a molar ratio of transition metal to magnesium is 0.2 or less, and a method of manufacturing a transition metal-substituted hydrotalcite catalyst for removing nitrogen oxides using a storage-reduction method, including the steps of preparing a hydrotalcite synthesis solution including transition metal precursors such that the molar ratio of transition metal to magnesium is 0.2 or less, and preferably 0.001 to 0.2; aging the synthesis solution; and hydrothermally treating the synthesis solution.

5 Claims, 3 Drawing Sheets

TRANSITION METAL-SUBSTITUTED HYDROTALCITE CATALYST FOR REMOVING NITROGEN OXIDES FROM THE EXHAUST GAS OF DIESEL ENGINE BY STORAGE-REDUCTION

CROSS-REFERENCE TO RELATED APPLICATIONS

This application is a continuation of U.S. patent application Ser. No. 11/820,959, filed on Jun. 21, 2007, now abandoned and is based upon and claims the benefit of priority from the prior Korean Patent Application No. 10/2006/0056659, filed Jun. 23, 2006, the entire contents of which are incorporated herein by reference.

BACKGROUND OF THE INVENTION

1. Field of the Invention

The present invention relates to a transition metal-substituted hydrotalcite catalyst for removing nitrogen oxides from the exhaust gas of diesel engines by NOx storage and reduction (NSR).

2. Description of the Related Art

In diesel engines, which are operated in the presence of excess oxygen to have high combustion efficiency, unlike gasoline engines, carbon monoxide, unburned hydrocarbons, and nitrogen oxides cannot all be removed using three-way catalysts because the concentration of oxygen included in the exhaust gas of diesel engines is high. For this reason, a selective catalytic reduction (SCR) method of removing nitrogen oxides by supplying urea as a reductant and an NOx storage and reduction (NSR) method of removing nitrogen oxides by reducing nitrogen oxides in an oxidation atmosphere after storing nitrogen oxides and then injecting fuel have been introduced. The NSR method can be easily applied to diesel automobiles because fuel is directly sprayed, and thus the addition of reactants is not required, with the result that additional facilities or apparatuses are not required.

Generally, the NSR catalyst is formed of precious metals, performing oxidation-reduction, and materials for storing nitrogen oxides. In an oxidation atmosphere, nitrogen oxides are oxidized to nitrogen dioxide by precious metal components, and then the nitrogen dioxide is stored in barium oxides, and, in a reduction atmosphere, in which fuel is sprayed, the stored nitrogen dioxide is desorbed, and the desorbed nitrogen dioxide is reduced to nitrogen in the presence of a precious metal catalyst. Accordingly, in order for the NSR catalyst to have excellent performance, in an oxidation atmosphere, a large amount of nitrogen dioxide must be stored, and, in a reduction atmosphere, nitrogen dioxide must be rapidly reduced. Further, the NSR catalyst must have excellent stability in order to be used for a long time in consideration of the properties of catalysts for purifying the exhaust gas of automobiles, which cannot be easily replaced. Since the exhaust gases of diesel engines are combustion products, and thus include a large amount of water, the NSR catalyst cannot help but be exposed to water for a long time. Since the NSR catalyst cannot be easily replaced, the NSR catalyst must have excellent hydrothermal stability in order to be stably used for a long time. Further, when sulfur compounds included in diesel fuel oil are combusted, sulfur dioxide is produced. Since sulfur dioxide has chemical properties similar to those of nitrogen dioxide, it is adsorbed to the nitrogen oxide adsorption sites of the NSR catalyst. Generally, since sulfur dioxide has stronger adsorbability than nitrogen dioxide, the adsorbed amount of nitrogen dioxide cannot help decreasing due to the adsorption of sulfur dioxide.

Accordingly, the preferred NSR catalyst for diesel engines must store a large amount of nitrogen dioxide in an oxidation atmosphere, and must easily reduce desorbed nitrogen dioxide in a reduction atmosphere due to the high dispersity and stability of precious metals. Further, in order for the NSR catalyst to be used as a commonly-used catalyst, the NSR catalyst must have excellent hydrothermal stability so that it can be used without being replaced for a long time, and must have excellent properties of resistance to sulfur dioxide poisoning.

The NSR catalyst is made of strongly basic materials in order to store nitrogen dioxide, which is acidic. Further, the NSR catalyst is made of water-stable materials so that it is not deformed or melted by aqueous vapor included in exhaust gas. For this reason, initially reported NSR catalysts were manufactured by supporting water-insoluble and strongly basic barium oxides in thermally-stable alumina having a large surface area. In this case, in order to increase basicity, potassium oxides can be added thereto. However, since alkali metal oxides are easily dissolved in water, the increase in basicity due to the addition of alkali metal oxides has been limited.

Meanwhile, hydrotalcite is carbonate of magnesium and aluminum, having hydroxide groups, and is generally represented by the molecular formula: $[M_{1-x}{}^{+2}M_x{}^{+3}(OH)_2]^{x+}[A_{x/n}{}^{n-}] \cdot mH_2O$. Here, $M^{+2}$ and $M^{+3}$ are divalent and trivalent cations, respectively, and typical elements thereof are magnesium and aluminum, respectively. A is an interlayer anion, and may be a carbonate ion. A brucite structure, including a cation formed by partially substituting a brucite structure of magnesium hydroxide with an aluminum ion, is bonded with an anion and water.

Divalent or trivalent metal ions having an ion radius similar to magnesium or aluminum can form a hydrotalcite structure. Metals, such as calcium (0.99 Å) or beryllium (0.35 Å), having an ion radius much greater or smaller than magnesium, cannot form a hydrotalcite structure. In contrast, metals, such as copper, nickel, cobalt, zinc, iron, gallium, chromium, manganese, and the like, having an ion radius similar to magnesium, replace magnesium or aluminum, thus forming a hydrotalcite structure. The composition ratio of divalent ions and trivalent ions is also important to the formation of a hydrotalcite structure. When the molar ratio $[M^{3+}]/([M^{3+}]+[M^{2+}])$ thereof is in the range of 0.20 to 0.33, a pure hydrotalcite structure is formed ([1] A. Vaccari, "Clays and catalysis: a promising future", *Appl. Clay Sci.*, 14, 161(1999)).

The size of anion is not particularly limited either, but a hydrotalcite structure can be formed of inorganic anions (fluorine, chlorine, bromine, nitric acid, and carbonic acid) and organic acids (adipic acid, oxalic acid, and malonic acid). The number and bonding force of anions bonded with brucite cations change depending on the kind of anion. The surface area of the synthesized hydrotalcite is in the range of 100 to 300 m$^2$/g, which is very large. The hydrotalcite functions to exchange anions because anions are included therein. The hydrotalcite can also be used for base catalysts because it has strong basicity. Further, the hydrotalcite is an oxide having a uniform composition and a predetermined structure because it is a crystalline material ([2] A. Vaccari, "Preparation and catalytic properties of cationic and anionic clays", *Catal. Today*, 41, 53(1998)).

The hydrotalcite can store nitrogen dioxide because it is a basic material. When the backbone thereof is substituted with metals having atomic radii similar thereto, the basicity thereof is changed. The hydrotalcite is stable in hydrothermal treatment and can widely disperse and support precious metal because it is bonded with hydroxide groups and has uniformly dispersed constituent atoms ([3] E. Kanezaki, "A thermally induced metastable solid phase of Mg/Al-layered double hydroxides by means of in situ high temperature powder X-ray diffraction" *J. Mater. Sci. Lett.*, 17, 371 (1998)).

SUMMARY OF THE INVENTION

The NSR catalyst must store a large amount of nitrogen dioxide, must be stable in aqueous vapor, and must have excellent properties of resistance to sulfur dioxide poisoning. For this reason, the basicity of the NSR catalyst must be increased in order to store a large amount of nitrogen dioxide. Further, in order to improve the performance of the catalyst by storing a large amount of nitrogen dioxide, the poisoning of the catalyst by sulfur dioxide must be suppressed by maximizing the difference in the adsorption selectivity between nitrogen dioxide and sulfur dioxide. Moreover, in order to use the NSR catalyst as a catalyst for purifying the exhaust gas of automobiles, the stability of the NSR catalyst must be increased such that the structure thereof is not deformed or sintered even in a repeated oxidation-reduction atmosphere or when the combustion products of hydrocarbons are exposed to aqueous vapor at high temperature.

Accordingly, in consideration of these facts, the present inventors developed an NSR catalyst active material having excellent performance, which increases the basicity and stability thereof, and enhances the adsorption selectivity of nitrogen dioxide, thereby being stably used for a long time, by applying hydrotalcite.

Generally, hydrotalcite stores nitrogen dioxide, which is acidic, because it is a basic material, but the hydrotalcite composed of magnesium and aluminum is similar to conventional barium oxide supported NSR catalysts in the aspect of the amount of stored nitrogen dioxide or the stability thereof, which are not very good. Further, when the hydrotalcite is synthesized and then baked, the surface area thereof is greatly decreased, and the amount of stored nitrogen dioxide is simultaneously decreased.

In order to overcome these problems, the present inventors developed a hydrotalcite catalyst, the structural stability of which is enhanced by substituting its backbone with transition metals, and the performance of which as a material for storing nitrogen dioxide is improved.

In order to accomplish the above object, an aspect of the present invention provides a transition metal-substituted hydrotalcite catalyst for removing nitrogen oxide using a storage-reduction method, wherein a molar ratio of transition metal to magnesium is 0.2 or less.

Further, another aspect of the present invention provides a method of manufacturing the transition metal-substituted hydrotalcite catalyst for removing nitrogen oxide using a storage-reduction method, including the steps of preparing a hydrotalcite synthesis solution including transition metal precursors such that the molar ratio of transition metal to magnesium is 0.2 or less, and preferably 0.001 to 0.2; aging the synthesis solution; and hydrothermally treating the synthesis solution.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, preferred embodiments of the present invention will be described in detail with reference to Examples. These Examples are set forth to illustrate the present invention, but should not be construed to be the limit of the present invention.

Example 1

Figure 1:
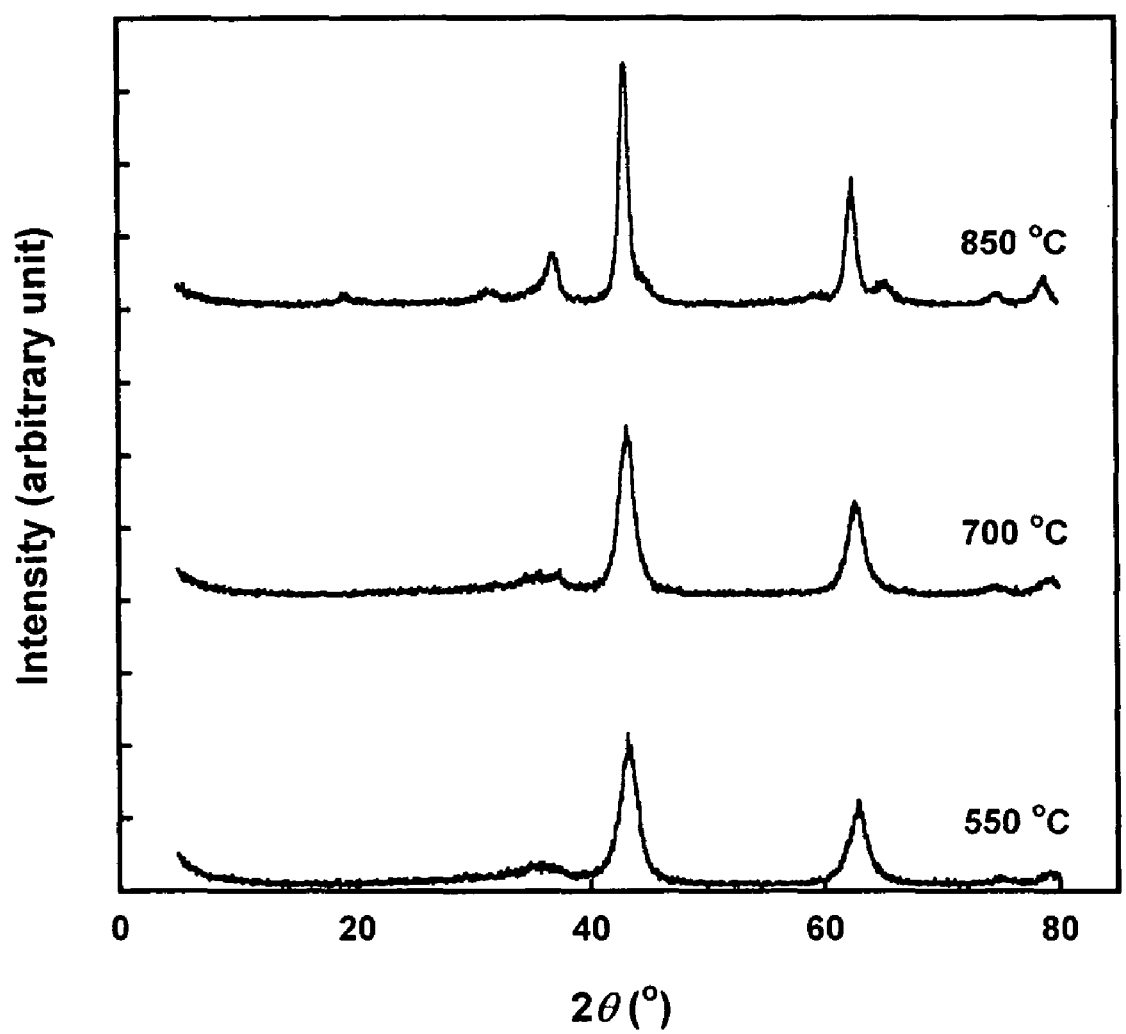
FIG. 1 is a graph showing the X-ray diffraction patterns of hydrotalcite synthesized in Example 1.

A hydrotalcite catalyst for storing and removing nitrogen dioxide from the exhaust gas of diesel engines was manufactured using a hydrothermal method. 68.5 g of aluminum nitrate and 145 g of magnesium nitrate were put in 500 ml of water and then sufficiently stirred to be completely dissolved in water. Further, 65 g of sodium hydroxide and 53.5 g of sodium carbonate were also dissolved in 500 ml of water. These two solutions were mixed, stirred at room temperature for 24 hours, and then aged. Subsequently, the aged solution was put in a high-pressure reactor, heated to a temperature of 100° C., and then reacted at this temperature for 4 hours. The reaction products were washed while solid products were filtrated therefrom, and were then dried at a temperature of 100° C. The dried reaction products were baked in an electrical furnace at a temperature of 550~850° C., thereby preparing hydrotalcite (HT). The amount of magnesium and aluminum, which are constituent elements of the hydrotalcite, was adjusted such that the ratio of magnesium to aluminum was 3/unit mole. The X-ray diffraction patterns of the synthesized hydrotalcite are shown in FIG. 1. In FIG. 1, as the baking temperature of the hydrotalcite is increased, the crystallinity of hydrotalcite is increased, and thus the diffraction peaks thereof become large and sharp. The X-ray diffraction patterns of a sample baked at a temperature of 850° C. closely matched those of the hydrotalcite reported in the document [3] with respect to the position and intensity of peaks.

Comparative Example

For comparison, a K2O—BaO/Al2O3 catalyst, which is a commonly-used NSR catalyst, was manufactured. 6.5 g of barium acetate and 2.6 g of potassium nitrate were dissolved in 100 ml of water to form a solution, and the solution was sufficiently stirred while 50 g of alumina was added thereto, and was then dried at a temperature of 100° C. The resultant was put in a electrical furnace, and was baked at a temperature of 550° C. in air, thereby manufacturing the K2O—BaO/Al2O3 catalyst.

Experimental Example 1

The amount of stored nitrogen dioxide was measured using a weight-type adsorption apparatus provided with a quartz spring balance. 0.05 g of a hydrotalcite catalyst was put in a quartz basket and was subjected to exhaust at a temperature of 300° C. for 1 hour. In consideration of the temperature of the exhaust gas of diesel automobiles, 20 Torr of nitrogen oxide gas was added thereto at a temperature of 200° C. When the catalyst was exposed to the nitrogen oxide gas, nitrogen oxide is stored in the catalyst, and thus the weight of the catalyst was increased. When there is no increase in the weight of the catalyst, the mass increase of the catalyst in the presence of the nitrogen oxide gas is defined as "adsorption amount", and the mass increase measured after the catalyst was subjected to the exhaust is defined as "storage amount".

The adsorption amount and storage amount of nitrogen dioxide of hydrotalcite catalysts baked at various temperatures are given in Table 1. As given in Table 1, the adsorption amount and storage amount of nitrogen dioxide of a hydrotalcite catalyst baked at a temperature of 550° C. are very large, but the storage amount of nitrogen dioxide of the hydrotalcite catalyst was slightly less than that of a K2O—BaO/Al2O3 catalyst, which is a conventional NSR catalyst. As the baking temperature of the hydrotalcite catalyst was increased, the adsorption amount and storage amount of nitrogen dioxide of the hydrotalcite catalyst become smaller. In the light of the fact that the X-ray diffraction peaks of the hydrotalcite become large and acute when the hydrotalcite is baked at high temperatures, it can be seen that the crystallinity thereof is increased, but the surface area thereof is decreased, thereby decreasing the nitrogen dioxide storage capacity.

TABLE 1

Influence of baking temperature on the adsorption amount and storage amount of nitrogen dioxide of hydrotalcite

|  |  | Baking temperature (° C.) | | | Comparative catalyst (K2O—BaO/ |
| --- | --- | --- | --- | --- | --- |
|  |  | 550 | 700 | 850 | Al2O3) |
| Crystallinity (%) |  | 100.0 | 118.1 | 159.8 | — |
| Surface area (m$^2$/g) |  | 150.7 | 136.1 | 141.0 | 120.0 |
| Nitrogen dioxide | Adsorption amount (mg/g$_{cat}$) | 69.4 | 50.0 | 39.6 | 69.7 |
|  | Storage amount (mg/g$_{cat}$) | 56.2 | 41.1 | 28.1 | 63.9 |

* measured at a temperature of 200° C.

Example 2

The hydrotalcite, which was prepared using the method describe in Example 1 and was then baked at a temperature of 550° C. for 6 hours, was hydrothermally treated at a temperature of 550~850° C. while dripping nitrogen including 10 wt % of water thereinto. Even if the hydrotalcite was hydrothermally treated, the X-ray diffraction peaks of the hydrotalcite were not considerably changed, but the characteristic peaks of MgAl2O4, having a spinel structure, were slightly exhibited. Compared to the crystallinity calculated based on a sample hydrothermally heated at temperature of 550° C., the crystallinity of a sample hydrothermally heated at temperature of 850° C. was 93.4%, which is high. The crystallinity of the hydrothermally-heated hydrotalcite and the adsorption amount and storage amount of nitrogen dioxide, measured using the method described in Experimental Example 1, are given in Table 2.

TABLE 2

Adsorption amount and storage amount of nitrogen dioxide of hydrothermally-treated hydrotalcite

| Hydrothermal treatment temperature (° C.) |  | 550 | 700 | 850 |
| --- | --- | --- | --- | --- |
| Crystallinity (%) |  | 100.0 | 99.8 | 93.4 |
| Surface area (m$^2$/g) |  | 156.1 | 157.0 | 138.3 |
| Nitrogen dioxide | Adsorption amount (mg/g$_{cat}$) | 68.4 | 66.6 | 59.0 |
|  | Storage amount (mg/g$_{cat}$) | 58.0 | 60.6 | 51.4 |

The surface area of hydrotalcite and the storage amount of nitrogen dioxide thereof is greatly decreased when the hydrotalcite is baked in air, but is slightly decreased when the hydrotalcite is hydrothermally treated. The storage amount of nitrogen dioxide of the hydrotalcite, hydrothermally-heated at a temperature of 700° C., was conversely increased even if the amount of the hydrothermally-heated hydrotalcite is small. Since the hydrotalcite includes hydroxide groups, when the hydrotalcite is heated in dry air, its structure is broken, and thus the storage amount of nitrogen dioxide is decreased, but, when water is not excessively included in air, hydroxide groups are supplied from water, and thus the structure of the hydrotalcite is conversely maintained in a hydrothermal treatment atmosphere.

Example 3

Figure 2:
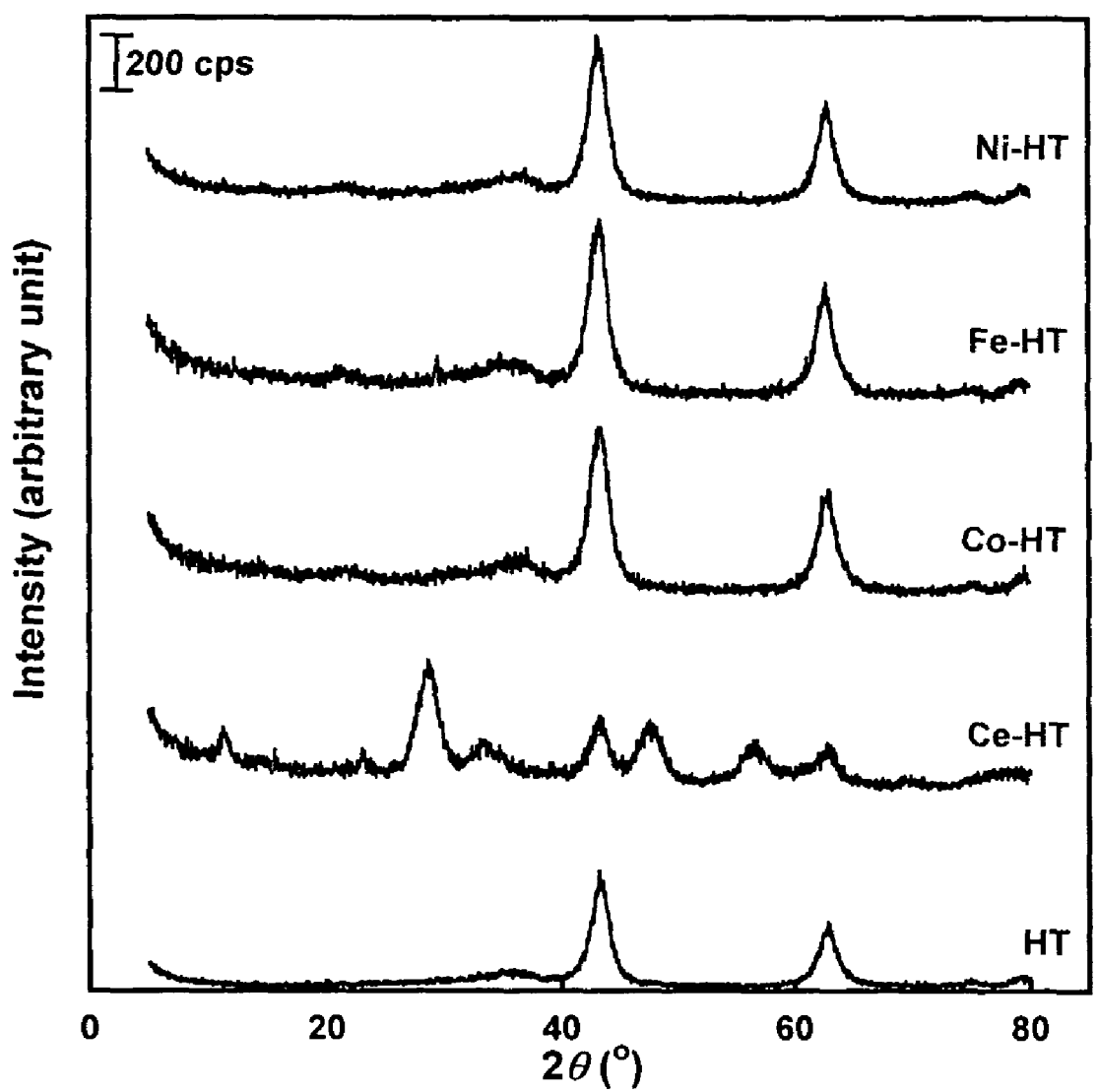
FIG. 2 is a graph showing the X-ray diffraction patterns of transition metal-substituted hydrotalcite synthesized in Example 3.

Transition metal precursors, such as nickel, cobalt, iron, cerium and the like, were dissolved in the synthesis solution prepared using the method described in Example 1, and were then hydrothermally treated, thereby preparing a transition metal-substituted hydrotalcite. For example, a method of preparing a cobalt-substituted hydrotalcite will be described. 68.5 g of aluminum nitrate, 145 g of magnesium nitrate, and 14.1 g of cobalt nitrate were put in 500 ml of water and then sufficiently stirred to be completely dissolved in water. Further, 65 g of sodium hydroxide and 53.5 g of sodium carbonate were also dissolved in 500 ml of water. These two solutions were mixed, stirred at room temperature for 24 hours, and then aged. Subsequently, the aged solution was put in a high-pressure reactor, and was then reacted at a temperature of 100° C. for 4 hours. The reaction products were washed while solid products were filtrated therefrom, and were then dried at a temperature of 100° C. Subsequently, the reaction products were baked at a temperature of 550° C. for 4 hours in order to maintain the surface area thereof, thereby preparing a hydrotalcite (Co—HT) substituted with cobalt in the backbone thereof. Further, instead of cobalt nitrate, cerium nitrate, ferric nitrate, nickel nitrate, and copper nitrate were put in the synthesis solution, and thus a hydrotalcite (Ce—HT) substituted in the backbone thereof with cerium, a hydrotalcite (Fe—HT) substituted in the backbone thereof with iron, a hydrotalcite (Cu—HT) substituted in the backbone thereof with copper, and a hydrotalcite (Ni—HT) substituted in the backbone thereof with nickel were prepared using the same method. The X-ray diffraction patterns of the transition metal-substituted hydrotalcite shown in FIG. 2 closely matched the results reported in the document [3]. However, in the cerium-substituted hydrotalcite, it can be seen that the characteristic peaks due to ceria were observed after baking, and thus cerium was partially phase-separated into a ceria state.

The adsorption amount and storage amount of nitrogen dioxide at a temperature of 200° C., measured using a weight type adsorption apparatus after hydrothermally treating the transition metal-substituted hydrotalcite using the method described in Example 2, are given in Table 3. When transition metals, such as cobalt, nickel, iron, cerium, and the like, are substituted in the backbone of the hydrotalcite, the adsorption amount and storage amount of nitrogen dioxide of the hydrotalcite is greatly increased. In particular, since the cerium-substituted Ce—HT catalyst stores a large amount of nitrogen dioxide, the transition metal substitution was very effective in increasing the storage amount of nitrogen dioxide.

TABLE 3

Adsorption amount and storage amount of nitrogen dioxide of transition metal-substituted hydrotalcite

| catalyst | | HT | Ce-HT | Co-HT | Fe-HT | Ni-HT |
|---|---|---|---|---|---|---|
| Nitrogen dioxide | Adsorption amount (mg/gcat) | 69.4 | 101.8 | 80.5 | 93.3 | 94.4 |
| | Storage amount (mg/gcat) | 56.2 | 96.1 | 72.8 | 83.1 | 90.7 |

Further, the decrease in the storage amount of nitrogen oxide of a hydrotalcite catalyst due to the adsorption of sulfur dioxide was also evaluated. Here, the catalyst was put in a weight type adsorption apparatus and was activated. Subsequently, sulfur dioxide was adsorbed in the activated catalyst for 1 hour by applying 10 Torr of sulfur dioxide vapor thereto. Subsequently, sulfur dioxide was exhausted from the catalyst, and then 20 Torr of nitrogen dioxide was further applied to the catalyst. In this state, the adsorption amount and storage amount of nitrogen dioxide of the catalyst was measured, and the results thereof are given in Table 4.

TABLE 4

The storage amount of sulfur dioxide and the adsorption amount and storage amount of nitrogen dioxide of the transition metal-substituted hydrotalcite

| | | catalyst | | | | | |
|---|---|---|---|---|---|---|---|
| | | HT | Ce-HT | Co-HT | Fe-HT | Ni-HT | Comparative catalyst (K2O—BaO/Al2O3) |
| Sulfur dioxide | Storage amount (mg/g$_{cat}$) | 40.0 | 88.2 | 49.6 | 53.0 | 50.8 | 37.4 |
| Nitrogen dioxide | Adsorption amount (mg/g$_{cat}$) | 23.5 | 46.7 | 55.5 | 35.9 | 33.0 | 31.7 |
| | Storage amount (mg/g$_{cat}$) | 15.3 | 43.2 | 48.3 | 28.2 | 21.3 | 15.9 |

* The adsorption amount and storage amount of nitrogen dioxide after the storage of sulfur dioxide.

When a hydrotalcite is substituted with transition metals, the storage amount of sulfur dioxide is slightly increased. However, the storage amount of nitrogen dioxide of the transition metal-substituted hydrotalcite, measured after the adsorption of sulfur dioxide, was 21.3~48.3 mg/gcat, which was greatly increased. In particular, the storage amount of nitrogen dioxide of the cobalt-substituted hydrotalcite, measured after the storage of sulfur dioxide, was 48.3 mg/gcat, which was nearly tripled, compared to that of the hydrotalcite not substituted with any transition metal, which was 15.3 mg/gcat. Therefore, the storage performance of nitrogen dioxide was mostly maintained even after the hydrotalcite was poisoned by sulfur dioxide.

Example 4

Precious metals, such as platinum, palladium, ruthenium, and the like, were supported on the hydrotalcite prepared using the method described in Example 1. Here, 5 g samples of hydrotalcite powder were respectively impregnated with 0.18 g of ammonium platinum chloride, 0.18 g of palladium nitrate, and 0.27 g of ruthenium chloride such that the amount of supported precious metals was 2% by weight. The hydrotalcite impregnated with the precious metals was dried at a temperature of 80° C. for 24 hours, and was then baked at a temperature of 550° C. for 4 hours, thereby preparing hydrotalcites supported with platinum, palladium, and ruthenium, respectively.

Experimental Example 2

The performance of reducing and then removing nitrogen dioxide of a precious metal-supported hydrotalcite catalyst was evaluated using an infrared spectrometer provided with a gas cell. 15 mg of a catalyst was pressed, and thus formed into a plate shape, and then the plate-shaped catalyst was installed in a sample support placed in the gas cell. Subsequently, the catalyst was exhausted at a temperature of 500° C. for 1 hour, cooled to a temperature of 200° C., and then supplied with 5 Torr of nitrogen dioxide. Subsequently, the catalyst was subjected to exhaust, thus removing nitrogen dioxide from the catalyst, and then the infrared absorption spectrum of the nitrogen dioxide stored in the catalyst was plotted in the range of 4000~700 cm-1 wave number. Subsequently, 15 Torr of hydrogen gas was applied to the nitrogen dioxide stored catalyst, and then the reduction and removal state of nitrogen dioxide was evaluated.

When nitrogen dioxide is stored in a precious metal-supported hydrotalcite catalyst, the absorption band of nitrate, which is bonded with ionic nitrate in a bidentate-coordinated state, appears in the range of 1200~1600 cm-1 wave number. In this case, when hydrogen gas is applied to the catalyst at a temperature of 200° C., the nitrogen dioxide stored in the catalyst was reduced and removed, and the absorption band thereof thus disappeared. In platinum- and palladium-supported hydrotalcite catalysts, the absorption bands of nitrate appear due to the adsorption of nitrogen dioxide, and reversibly disappeared due to the hydrogen treatment of the catalysts. In contrast, in a ruthenium-supported catalyst, the absorption band of nitrogen dioxide appears, but the nitrogen dioxide stored in the catalyst was not removed even when hydrogen was applied to the catalyst.

Figure 3:
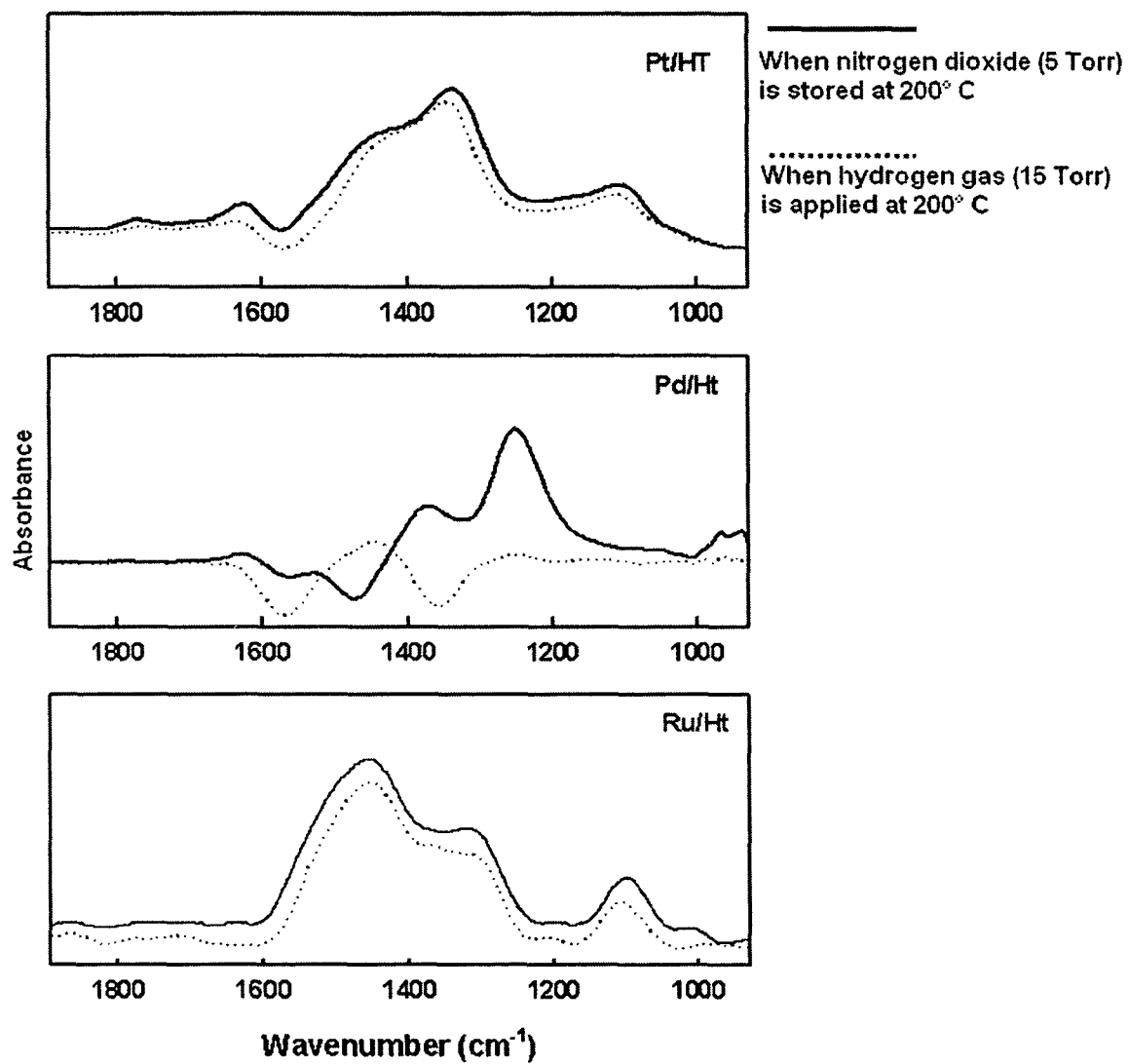
FIG. 3 is graphs showing the results of experimentation on the performance of adsorbing and removing nitrogen dioxide using an infrared spectrometer after the heat treatment of hydrotalcite supported with precious metals in Example 4.

Meanwhile, the precious metal-supported hydrotalcite catalyst was hydrothermally treated with aqueous vapor containing nitrogen gas using the hydrothermal treatment method described in Example 2, and then the performance of storing nitrogen dioxide and the function of reducing and removing nitrogen dioxide using hydrogen were evaluated. As shown in FIG. 3, in the platinum supported hydrotalcite catalyst, the function of the catalyst was deteriorated, and thus the nitrogen oxide stored in the catalyst was partially removed even when hydrogen was applied to the catalyst. In contrast, in the palladium supported hydrotalcite catalyst, the nitrogen dioxide stored in the catalyst was almost completely removed, even after hydrothermal treatment, and thus the function of reducing and removing nitrogen dioxide was maintained as before, even after hydrothermal treatment.

Example 5

A hydrotalcite was prepared using aluminum sulfate and magnesium sulfate instead of aluminum nitrate and magnesium nitrate. 69.7 g of aluminum sulfate and 139.4 g of magnesium sulfate were put in 500 ml of water and then sufficiently stirred to be completely dissolved in water. Further, 65 g of sodium hydroxide and 53.5 g of sodium carbonate were also dissolved in 500 ml of water. These two solutions were mixed at room temperature, and then the mixed solution was put in a high-pressure reactor, stirred for 24 hours, and aged. Subsequently, the mixed solution was reacted at a temperature of 100° for 4 hours. The reaction products were washed while solid products were filtrated therefrom, and were then dried. The position and intensity of the X-ray diffraction peaks of the hydrotalcite, synthesized by replacing starting materials, closely matched those of the hydrotalcite prepared using the method described in Example 1. As given in Table 5, the adsorption amount and storage amount of nitrogen dioxide of the hydrotalcite prepared using the sulfates was larger than those of the hydrotalcite prepared using the nitrates through the method described in Example 1. Further, the adsorption amount and storage amount thereof was also larger than those of commonly-used comparative barium oxide catalysts.

TABLE 5

Adsorption amount and storage amount of nitrogen dioxide of the hydrotalcite prepared using sulfates

|  |  | Kind of catalyst |  |  |
|---|---|---|---|---|
|  |  | Prepared using nitrates | Prepared using sulfates | Comparative catalyst (K2O—BaO/Al2O3) |
| Surface area (m²/g) |  | 156.1 | 194.5 | 120.0 |
| Nitrogen dioxide | Adsorption amount (mg/$g_{cat}$) | 69.4 | 81.0 | 69.7 |
|  | Storage amount (mg/$g_{cat}$) | 56.2 | 69.4 | 63.9 |

Example 6

A catalyst for purifying exhaust gas was manufactured by supporting an iron-substituted hydrotalcite in a honeycomb, and then the performance of removing the nitrogen oxides discharged from automobile engines was evaluated. 274 g of aluminum nitrate, 580 g of magnesium nitrate, and 77.5 g of ferric nitrate were put in 2000 ml of water and then sufficiently stirred to be completely dissolved in water. Further, 260 g of sodium hydroxide and 214 g of sodium carbonate were also dissolved in 2000 ml of water. These two solutions were mixed at room temperature, and then the mixed solution was put in a high-pressure reactor and then aged. Subsequently, the mixed solution was heated to a temperature of 100° C., and was then reacted for 4 hours. Then, the reaction products were filtered and washed. As the method in Example, 1000 g samples of the iron-substituted hydrotalcite were simultaneously impregnated with ammonium platinum chloride and palladium nitrate, which are precious metal precursors, such that the amounts of supported precious metals were 1% and 0.5% by weight, respectively. The iron-substituted hydrotalcite impregnated with the precious metals was dried at a temperature of 80° C. for 24 hours, and was then baked at a temperature of 550° C. for 4 hours, thereby preparing iron-substituted hydrotalcites supported with platinum and palladium. The iron-substituted hydrotalcite supported with precious metals was dispersed in water, and was then pulverized in order to be suitably adhered to a cordierite honeycomb, thereby forming a suspension. The suspension was applied on the cordierite honeycomb, and was then dried at a temperature of 130~150° C. for 10 minutes. Subsequently, the dried cordierite honeycomb, coated with the suspension, was heated to a temperature of 530-550° C., and was baked for 40 minutes, thereby manufacturing a catalyst. After the manufactured catalyst was heat-treated in an electrical furnace at a temperature of 750° C. for 6 hours, the NOx removal performance of the catalyst was evaluated.

Experimental Example 3

The NOx removal performance of the manufactured catalyst was evaluated using a PLB-5 method in a sigma 3.5 diesel engine dynamic testing apparatus. After the catalyst was pretreated in an atmosphere having excess fuel for 120 seconds, the NOx removal performance was evaluated while the catalyst was repeatedly passed through a fuel stop step for 60 seconds and a fuel spray step for 2 seconds ten times. The space velocity of the catalyst was 40,000 h-1 in a fuel excess atmosphere, 56,000 h-1 in a fuel spray atmosphere, and 72,000 h-1 in a spray stop atmosphere. As given in Table 6, the NOx removal rate of the catalyst, evaluated while changing the temperature of the inlet of a catalyst layer to a temperature of 200~400° C., was about 80%, which was very high.

TABLE 6

Nitrogen oxides removal performance of the catalyst for purifying exhaust gas, manufactured using the iron-substituted hydrotalcite.

|  | NOx removal rate (%) | | | |
|---|---|---|---|---|
|  | Hydrotalcite-based NSR | | Barium-based NSR | |
| Operation temperature (° C.) | Before hydrothermal treatment | After hydrothermal treatment | Before hydrothermal treatment | After hydrothermal treatment |
| 200 | 78.8 | 48.0 | 31.0 | 7.0 |
| 300 | 77.5 | 40.5 | 55.0 | 19.0 |
| 400 | 82.3 | 43.3 | 44.0 | 16.0 |

The present invention provides an NSR catalyst active material having excellent performance, which increases the basicity and stability thereof, and enhances the adsorption selectivity of nitrogen dioxide, thereby being stably used for a long time, by applying hydrotalcite, and a method of preparing the same.

What is claimed is:

1. A method for storing nitrogen oxides from an exhaust gas of a diesel engine, said method comprising:
    contacting a transition metal-substituted hydrotalcite catalyst with said exhaust gas;
    removing said nitrogen oxides from said exhaust gas; and
    storing said removed nitrogen oxides in said transition metal-substituted hydrotalcite catalyst, wherein a molar ratio of transition metal to magnesium is 0.2 or less.

2. The method according to claim 1, wherein said transition metal is selected from the group consisting of: cobalt, cerium, copper, iron, and nickel.

3. The method according to claim 1, wherein said hydrotalcite catalyst includes an interlayer anion which is selected from the group consisting of: a carbonic acid ion, a nitric acid ion, and a sulfuric acid ion.

4. The method according to claim 1, wherein said hydrotalcite catalyst further includes platinum group precious metals supported therein.

5. The method according to claim 1, wherein said transition metal-substituted hydrotalcite catalyst is formed by a method comprising:

preparing a hydrotalcite synthesis solution including a transition metal precursors such that a molar ratio of transition metal to magnesium is 0.2 or less;

aging said hydrotalcite synthesis solution; and hydrothermally treating the synthesis solution, thereby forming aid transition metal-substituted hydrotalcite catalyst.

* * * * *